United States Patent
Duan et al.

(10) Patent No.: US 10,850,349 B2
(45) Date of Patent: Dec. 1, 2020

(54) METHOD FOR MACHINING MICRO-HOLES IN METAL OR ALLOY PRODUCT

(71) Applicant: Central South University, Hunan (CN)

(72) Inventors: Ji'an Duan, Hunan (CN); Hua Wang, Hunan (CN); Cong Wang, Hunan (CN); Xinran Dong, Hunan (CN)

(73) Assignee: Central South University, Hunan (CN)

( * ) Notice: Subject to any disclaimer, the term of this patent is extended or adjusted under 35 U.S.C. 154(b) by 213 days.

(21) Appl. No.: 15/966,082

(22) Filed: Apr. 30, 2018

(65) Prior Publication Data
US 2018/0354068 A1 Dec. 13, 2018

(30) Foreign Application Priority Data
Jun. 12, 2017 (CN) .......................... 2017 1 0439036

(51) Int. Cl.
*B23K 26/0622* (2014.01)
*B23K 26/06* (2014.01)
(Continued)

(52) U.S. Cl.
CPC ........ *B23K 26/0624* (2015.10); *B23K 26/067* (2013.01); *B23K 26/0643* (2013.01);
(Continued)

(58) Field of Classification Search
CPC ............ B23K 2103/05; B23K 26/0624; B23K 26/0643; B23K 26/389; B23K 26/02; B23K 26/022
(Continued)

(56) References Cited

U.S. PATENT DOCUMENTS

| | | | | |
|---|---|---|---|---|
| 3,419,321 A | * | 12/1968 | Barber | ............... B23K 26/0652 219/121.7 |
| 6,809,291 B1 | | 10/2004 | Neil et al. | |
| 8,988,673 B2 | * | 3/2015 | Guttman | ............... G01J 1/0422 356/121 |

FOREIGN PATENT DOCUMENTS

| | | |
|---|---|---|
| CN | 102834216 A | 12/2012 |
| CN | 103862168 A * | 6/2014 |

(Continued)

OTHER PUBLICATIONS

English abstracts of cited non-English patent documents, 2 pages.

*Primary Examiner* — Ibrahime A Abraham
*Assistant Examiner* — Dilnessa B Belay
(74) *Attorney, Agent, or Firm* — Luedeka Neely Group, P.C.

(57) ABSTRACT

Provided is a method for machining micro-holes in a metal or alloy product which relates to the field of micro-hole machining. The method reduces the duration of ejection of primary plasma and the residuals produced during the ejection of the primary plasma, improves the smoothness of the hole wall of the micro-hole, and increases the depth limit of the micro-hole. Injecting energy by a low-energy pulse laser in two attempts further facilitates the reduction of the diameter of the micro-hole and reduces the possibility of cracks, compared with injection of the same energy by a single high-energy pulse laser. Moreover, a ratio between the diameter of the central ring of the ring spot formed by the focused second laser beam and the diameter of the central ring of the Gaussian spot formed by the focused first laser beam is greater than 1, which can improve the injection efficiency of laser energy.

10 Claims, 7 Drawing Sheets

(51) Int. Cl.
    *B23K 26/067*     (2006.01)
    *B23K 26/382*     (2014.01)
    *B23K 26/073*     (2006.01)
    *B23K 103/04*     (2006.01)

(52) U.S. Cl.
    CPC ...... *B23K 26/0648* (2013.01); *B23K 26/0734* (2013.01); *B23K 26/382* (2015.10); *B23K 26/389* (2015.10); *B23K 2103/04* (2018.08); *B23K 2103/05* (2018.08)

(58) Field of Classification Search
    USPC .......................................... 219/121.6, 121.76
    See application file for complete search history.

(56) References Cited

FOREIGN PATENT DOCUMENTS

| | | | | |
|---|---|---|---|---|
| CN | 103878496 | A | 6/2014 | |
| CN | 103972780 | A | 8/2014 | |
| CN | 204209284 | U | 3/2015 | |
| CN | 204504504 | U | 7/2015 | |
| CN | 104889576 | A | 9/2015 | |
| CN | 105591280 | A | 5/2016 | |
| CN | 206169491 | U | 5/2017 | |
| EP | 3382826 | A1 * | 10/2018 | .......... H01S 3/0057 |
| JP | H10186240 | A | 7/1998 | |
| JP | 2010-96666 | A | 3/2013 | |

\* cited by examiner

METHOD FOR MACHINING MICRO-HOLES IN METAL OR ALLOY PRODUCT

CROSS-REFERENCE TO RELATED APPLICATION

This application claims the priority to Chinese patent application No. 2017104390363, entitled "Method for Machining Micro-Holes in Metal or Alloy Product" and filed with the State Intellectual Property Office of People's Republic of China on Jun. 12, 2017, which is hereby incorporated by reference in its entirety.

Technical Field

The present disclosure relates to the field of micro-hole machining, and particularly to a method for machining micro-holes in a metal or alloy product.

Background Art

In the field of machining micro-holes in metal and alloy materials, the technology of micro deep holes machining with laser is widely applied in the field of micro-hole machining, such as the machining of turbine blades, oil pumps, nozzles, filter screens, spinneret plates, water jets, molds, medical instruments, clock and watch parts and printed circuit boards. Since the invention of femtosecond laser in 1980s, various ultra-short laser pulses, particularly femtosecond pulse laser, have been widely applied to subjects such as physics, chemistry, machinery and biology. The laser wavelength ranges nearly from infrared waveband to extreme ultraviolet waveband, and the pulse width has been reduced even to few optical cycles. Having a different machining principle from the traditional long pulse laser machining, the femtosecond laser can inject all of its energy into a small zone of action (normally in an order of 10 to 100 $\mu m^2$) within an extremely short period of time (normally about 100 fs). Instant high-energy density deposition will cause the absorption and movement of electrons to change, which may avoid the influence of linear laser absorption, energy transfer and diffusion, and thus the mechanism based on which the laser and substances interact with each other is essentially changed. In addition, with the threshold feature of materials, the machining area can be much smaller than the zone of laser action, and the machining size can break through the diffraction limit, so that the machining method thereof has an ultra-high precision, an ultra-high spatial resolution and no limit to materials to be machined.

Due to the affection of critical plasma shielding, micro-hole machined with femtosecond laser in the prior art normally has a hole depth limit no more than 300 μm, which is not deep enough, and has an ablation hole diameter more than 100 μm, which is large. Therefore, it produces thick recast layers and many thick cracks, along with a low utilization rate of ultra-short laser pulse energy.

DISCLOSURE OF THE INVENTION

An object of the present disclosure includes providing a method for machining micro-holes in a metal or alloy product, which is intended to alleviate the above problems.

An embodiment of the present disclosure provides a method for machining micro-holes in a metal or alloy product. The method for machining micro-holes in a metal or alloy product includes steps of:

step A. an ultra-short laser pulse generator generating ultra-short laser pulses and outputting the ultra-short laser pulses to a laser state adjusting device;

step B. the laser state adjusting device regulating a diameter of a spot formed by the ultra-short laser pulses output by the ultra-short laser pulse generator to a required first spot diameter, splitting the regulated ultra-short laser pulses into a first laser beam and a second laser beam, and outputting the first laser beam and the second laser beam to a Gaussian laser pulse generating device and a ring laser pulse generating device respectively, here, laser pulses of each of the first laser beam and the second laser beam per unit time are in number of a preset value;

step C. the Gaussian laser pulse generating device regulating power of the first laser beam, collimating the first laser beam, regulating a spot of the first laser beam to have a required second spot diameter, delaying the regulated first laser beam to generate Gaussian laser pulses, and outputting the Gaussian laser pulses to the laser pulse combining device, specifically, an optical path difference between an optical arm formed by the Gaussian laser pulse generating device and an optical arm formed by the ring laser pulse generating device is within a preset range;

step D. the ring laser pulse generating device regulating power of the second laser beam, collimating the second laser beam, regulating a spot of the second laser beam to have a required third spot diameter, then modulating the regulated second laser beam into ring laser pulses, pre-focusing the ring laser pulses and outputting the pre-focused ring laser pulses to the laser pulse combining device; and step E. the laser pulse combining device combining the Gaussian laser pulses and the ring laser pulses to generate mixed ultra-short laser pulses, focusing the mixed ultra-short laser pulses, and directing the focused mixed ultra-short laser pulses to hit the metal or alloy product to be inspected.

Furthermore, the laser state adjusting device includes a variable-aperture diaphragm, an optical shutter, a first control terminal and a beam splitting prism. The first control terminal is electrically connected with the optical shutter. The step B includes:

the variable-aperture diaphragm regulating the diameter of the spot formed by the ultra-short laser pulses output by the ultra-short laser pulse generator to the required first spot diameter, and outputting the regulated ultra-short laser pulses to the optical shutter;

the first control terminal controlling the optical shutter to be opened every preset time interval, so as to control the laser pulses inputted to the beam splitting prism per unit time to be in number of a preset value; and the beam splitting prism splitting the ultra-short laser pulses passing through the optical shutter into the first laser beam and the second laser beam, and outputting the first laser beam and the second laser beam to the Gaussian laser pulse generating device and the ring laser pulse generating device, respectively.

Furthermore, the laser state adjusting device includes a variable-aperture diaphragm and a beam splitting prism.

The step of outputting the ultra-short laser pulses to a laser state adjusting device includes: outputting the femtosecond ultra-short laser pulses to the variable-aperture diaphragm, specifically, the ultra-short laser pulses inputted to the variable-aperture diaphragm per unit time is controlled to be in number of a preset value.

The step B includes:

the variable-aperture diaphragm regulating the diameter of the spot formed by the ultra-short laser pulses output by the ultra-short laser pulse generator to the required first spot diameter, and outputting the regulated laser pulses to the beam splitting prism; and the beam splitting prism splitting the regulated ultra-short laser pulses into the first laser beam and the second laser beam, and outputting the first laser beam and the second laser beam to the Gaussian laser pulse generating device and the ring laser pulse generating device, respectively.

Furthermore, the Gaussian laser pulse generating device includes a first optical energy control component, a first telescope component, a second control terminal, a first three-dimensional micro-displacement driving platform and a right-angle prism. The second control terminal is electrically connected with the first three-dimensional micro-displacement driving platform. The right-angle prism is mounted on the first three-dimensional micro-displacement driving platform. The step C includes:

the first optical energy control component receiving the first laser beam output by the laser state adjusting device, regulating the power of the first laser beam, and outputting the first laser beam to the first telescope component;

the first telescope component collimating the first laser beam, regulating the spot of the first laser beam to have the required second spot diameter, and outputting the regulated first laser beam to the right-angle prism; and the second control terminal controlling the first three-dimensional micro-displacement driving platform to drive the right-angle prism to be displaced, so as to delay the regulated first laser beam by a preset time and generate the Gaussian laser pulses, and outputting the Gaussian laser pulses to the laser pulse combining device.

Furthermore, the ring laser pulse generating device includes a second optical energy control component, a second telescope component, a ring laser pulse modulating component and a one-dimensional convex lens. The step D includes:

the second optical energy control component receiving the second laser beam output by the laser state adjusting device, regulating the power of the second laser beam, and outputting the second laser beam to the second telescope component;

the second telescope component collimating the second laser beam, regulating the spot of the second laser beam to have the required third spot diameter, and outputting the regulated second laser beam to the ring laser pulse modulating component;

the ring laser pulse modulating component adjusting the regulated second laser beam to the ring laser pulses; and the one-dimensional convex lens pre-focusing the ring laser pulses and outputting the pre-focused ring laser pulses to the laser pulse combining device.

Furthermore, the ring laser pulse generating device further includes a third control terminal and a first spatial optical modulator. The third control terminal is electrically connected with the first spatial optical modulator. Before the second optical energy control component outputs the second laser beam to the second telescope component, the method for machining micro-holes in a metal or alloy product further includes steps of:

the first spatial optical modulator receiving the second laser beam output by the second optical energy control component;

the second control terminal controlling the first spatial optical modulator to modulate the second laser beam, such that energy of the second laser beam is distributed evenly; and the first spatial optical modulator outputting the modulated second laser beam to the second telescope component.

Furthermore, the ring laser pulse modulating component is a axicon lens, the second laser beam is output perpendicularly to a planar surface of the axicon lens, and an optical axis of the optical arm formed by the ring laser pulse generating device coincides with an optical axis of the axicon lens; or the ring laser pulse modulating component is a second spatial optical modulator, and the third control terminal is configured to control the second spatial optical modulator to modulate the second laser beam into the ring laser pulses.

Furthermore, the laser pulse combining device includes a beam combination prism, a laser power meter and a long-focus microscope objective. The step E includes:

the beam combination prism combining the Gaussian laser pulses and the ring laser pulses to generate the mixed ultra-short laser pulses, and outputting the mixed ultra-short laser pulses to the laser power meter;

the laser power meter detecting power of the mixed ultra-short laser pulses; and the long-focus microscope objective receiving the mixed ultra-short laser pulses detected by the laser power meter, focusing the mixed ultra-short laser pulses and directing the focused mixed ultra-short laser pulses to hit the metal or alloy product to be inspected.

Furthermore, after the step E, the method for machining micro-holes in a metal or alloy product further includes:

step F. a spot image detection and adjustion device acquiring an image of spots formed by the mixed ultra-short laser pulses on a plane of a to-be-inspected surface of the metal or alloy product, and determining, according to the acquired image, whether a Rayleigh length of a ring spot formed by the pre-focused ring laser pulses on the to-be-inspected surface of the metal or alloy product is a first preset length, and whether the ring spot is at a first preset focal position, as well as whether a Rayleigh length of a Gaussian spot formed by the Gaussian laser pulses on the to-be-inspected surface of the metal or alloy product is a second preset length and whether the Gaussian spot is at a second preset focal position, where if not, the Rayleigh length of the ring spot formed by the pre-focused ring laser pulses on the to-be-inspected surface of the metal or alloy product is adjusted to the first preset length, the ring spot is adjusted to be at the first preset focal position, the Rayleigh length of the Gaussian spot formed by the Gaussian laser pulses on the to-be-inspected surface of the metal or alloy product is adjusted to the second preset length, and the Gaussian spot is adjusted to be at the second preset focal position.

Furthermore, the spot image detection and adjustion device includes an image acquisition module, a fourth control terminal and a second three-dimensional micro-displacement driving platform. The fourth control terminal is electrically connected with each of the image acquisition module and the second three-dimensional micro-displacement driving platform. The step F includes:

the image acquisition module acquiring the image of spots formed by the mixed ultra-short laser pulses on a plane of a to-be-inspected surface of the metal or alloy product; and the third control terminal determining, according to the acquired image, whether the Rayleigh length of the ring spot formed by the pre-focused ring laser pulses on the to-be-inspected surface of the metal or alloy product is the first preset length, whether the ring spot is at the first preset focal position, whether the Rayleigh length of the Gaussian spot formed by the Gaussian laser pulses on the to-be-inspected surface of the metal or alloy product is the second preset length and whether the Gaussian spot is at the second preset focal position, where if not, the second three-dimensional micro-displacement driving platform is controlled to move, so that the Rayleigh length of the ring spot formed by the pre-focused ring laser pulses on the to-be-inspected surface of the metal or alloy product is the first preset length, the ring spot is at the first preset focal position, the Rayleigh length of the Gaussian spot formed by the Gaussian laser pulses on the to-be-inspected surface of the metal or alloy product is the second preset length and the Gaussian spot is at the second preset focal position.

The method for machining micro-holes in the metal or alloy product provided by embodiments of the present disclosure provides the following beneficial effects as follows. In the case where the mixed ultra-short laser pulses are perpendicularly output to the surface to be inspected according to a delay time, it is possible to inject more energy to the bottom of a micro-hole formed on a to-be-inspected surface of a metal or alloy product, and secondary plasma may be generated at the bottom of the micro-hole, which contributes to deepening of the micro-hole, thus facilitating the hole depth to reach the required depth limit or depth requirement. The first laser beam first reaches the surface to be inspected to inject energy and generate primary plasma. During a period after the primary plasma is generated and before the primary plasma vanishes, the delayed second laser beam reaches the surface to be inspected. At this point, the ring ultra-short laser pulses penetrate and cross over the primary plasma to achieve secondary energy injection and generate secondary plasma at the bottom of the micro-hole, to inject energy by the delayed ring ultra-short laser pulses, while the central hollow area further facilitates creation of an ejection passage for the primary plasma. Backward shock waves generated by the localized secondary plasma can accelerate the rapid ejection of the primary plasma, shortening the time of ejection of the primary plasma, reducing the residuals produced during the ejection of the primary plasma, and improving the smoothness of the hole wall of the micro-hole. Forward shock waves generated by the localized secondary plasma can further deepen the micro-hole. Injecting energy by low-energy pulse laser in two attempts further facilitates the reduction of the diameter of the micro-hole and reduces the possibility of cracks, compared with single high-energy pulse laser with the same total energy.

BRIEF DESCRIPTION OF DRAWINGS

In order to more clearly illustrate the technical solutions in the embodiments of the present disclosure, drawings necessary for the embodiments will be briefly described below. It should be understood that the following drawings merely show some embodiments of the disclosure and thus should not be construed as limiting the scope. Other related drawings can be obtained by those ordinarily skilled in the art according to these drawings without any creative effort.

REFERENCE SIGNS

Figure 1:
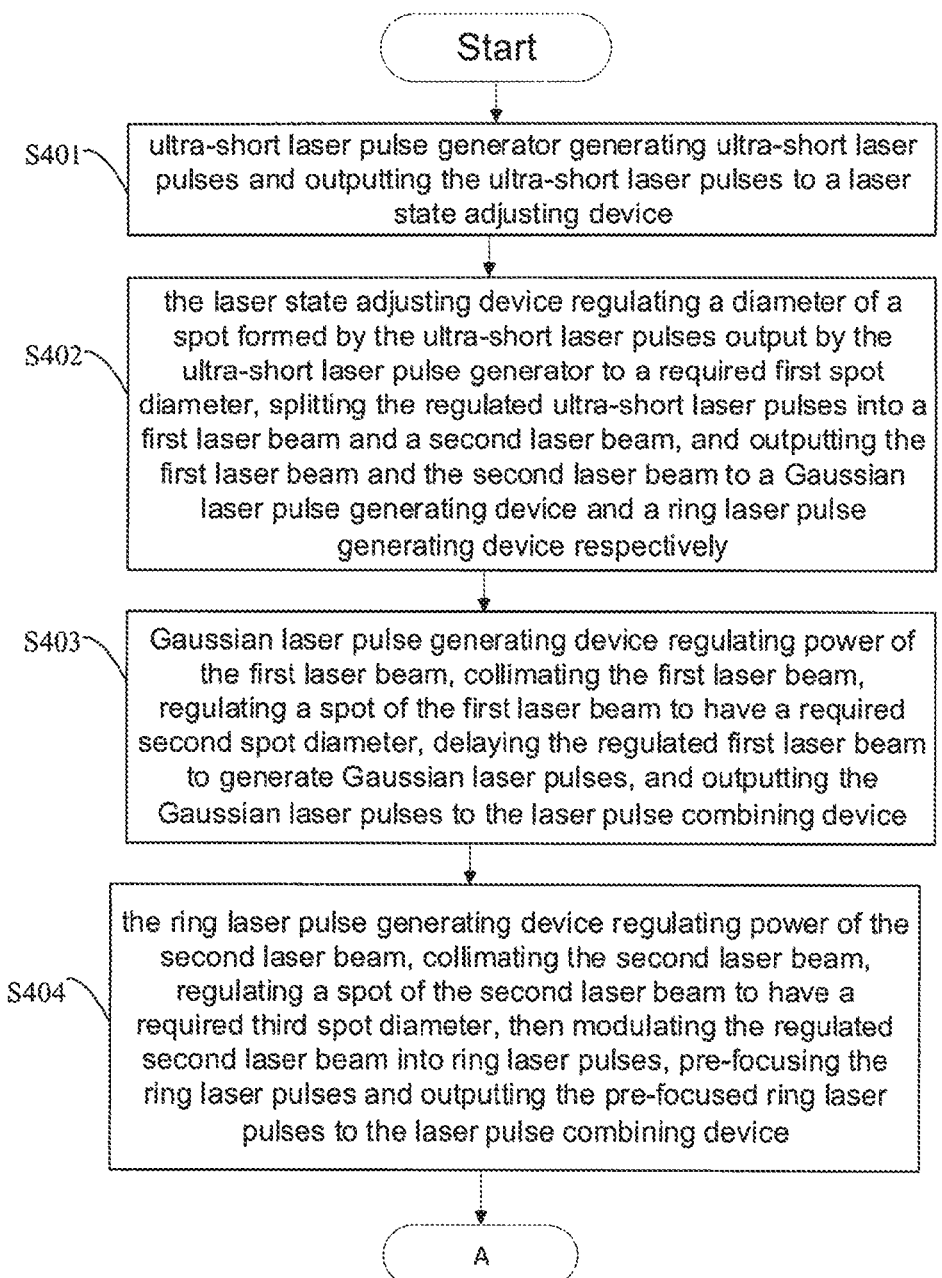
FIG. 1 and FIG. 2 are flow charts of a method for machining micro-holes in a metal or alloy product provided in an embodiment of the present disclosure.

101—ultra-short laser pulse generator; 102—laser state adjusting device; 103—Gaussian laser pulse generating device; 104—ring laser pulse generating device; 105—laser pulse combining device; 106—spot image detection and adjustion device; 107—variable-aperture diaphragm; 108—optical shutter; 109—first control terminal; 110—beam splitting prism; 111—first optical energy control component; 112—first telescope component; 113—second control terminal; 114—first three-dimensional micro-displacement driving platform; 115—right-angle prism; 116—second optical energy control component; 117—second telescope component; 118—ring laser pulse modulating component; 119—one-dimensional convex lens; 120—third control terminal; 121—first spatial optical modulator; 122—image acquisition module; 123—fourth control terminal; 124—second three-dimensional micro-displacement driving platform; 125—dielectric reflecting mirror; 126—stainless steel plate; 127—central axis of a micro-hole; 128—forward shock wave; 129—backward shock wave; 130—secondary plasma; 131—under-dense plasma area; 132—ring laser pulse; 133—critical density surface; 134—dense plasma area; 135—Gaussian laser pulse; 136—beam combination prism; 137—laser power meter; 138—long-focus microscope objective.

DETAILED DESCRIPTION OF EMBODIMENTS

In order to make the objects, technical solutions and advantages of the embodiments of the present disclosure more clear, the technical solutions in the embodiments of the present disclosure will be clearly and comprehensively described with reference to the figures for the embodiments of the present disclosure. Apparently, the embodiments described are merely some, but not all of the embodiments of the present disclosure. Normally, the components in the embodiments of the disclosure described and illustrated in the drawings herein can be arranged and designed in various configurations. Hence, the following detailed description of the embodiments of the present disclosure provided in the figures is not intended to limit the scope of the disclosure as claimed, but merely shows the selected embodiments of the present disclosure. All the other embodiments obtained by those ordinarily skilled in the art based on the embodiments provided in the present disclosure without paying creative efforts shall fall within the scope of protection of the present disclosure. It should be noted that similar reference signs and letters refer to similar items in the following figures. Therefore, once an item is defined in a figure, it will not be further defined or explained in the following figures. It is to be appreciated that in the description of the present disclosure, orientation or positional relations indicated by terms such as "center", "upper", "lower", "left", "right", "vertical", "horizontal", "inner" and "outer" are the orientation or positional relations shown based on the figures, or the conventional orientation or positional relations in the use of the products of the present disclosure, or those conventionally perceived by those skilled in the art, only for facilitating and simplifying description of the present disclosure, rather than indicating or implying that the referred devices or elements must be in a particular orientation or constructed or operated in the particular orientation, and therefore they should not be construed as limiting the present disclosure. In addition, terms like "first", "second" and "third" are merely used for distinctive purpose, but should not be construed as indicating or implying relative importance.

Embodiment

Figure 2:
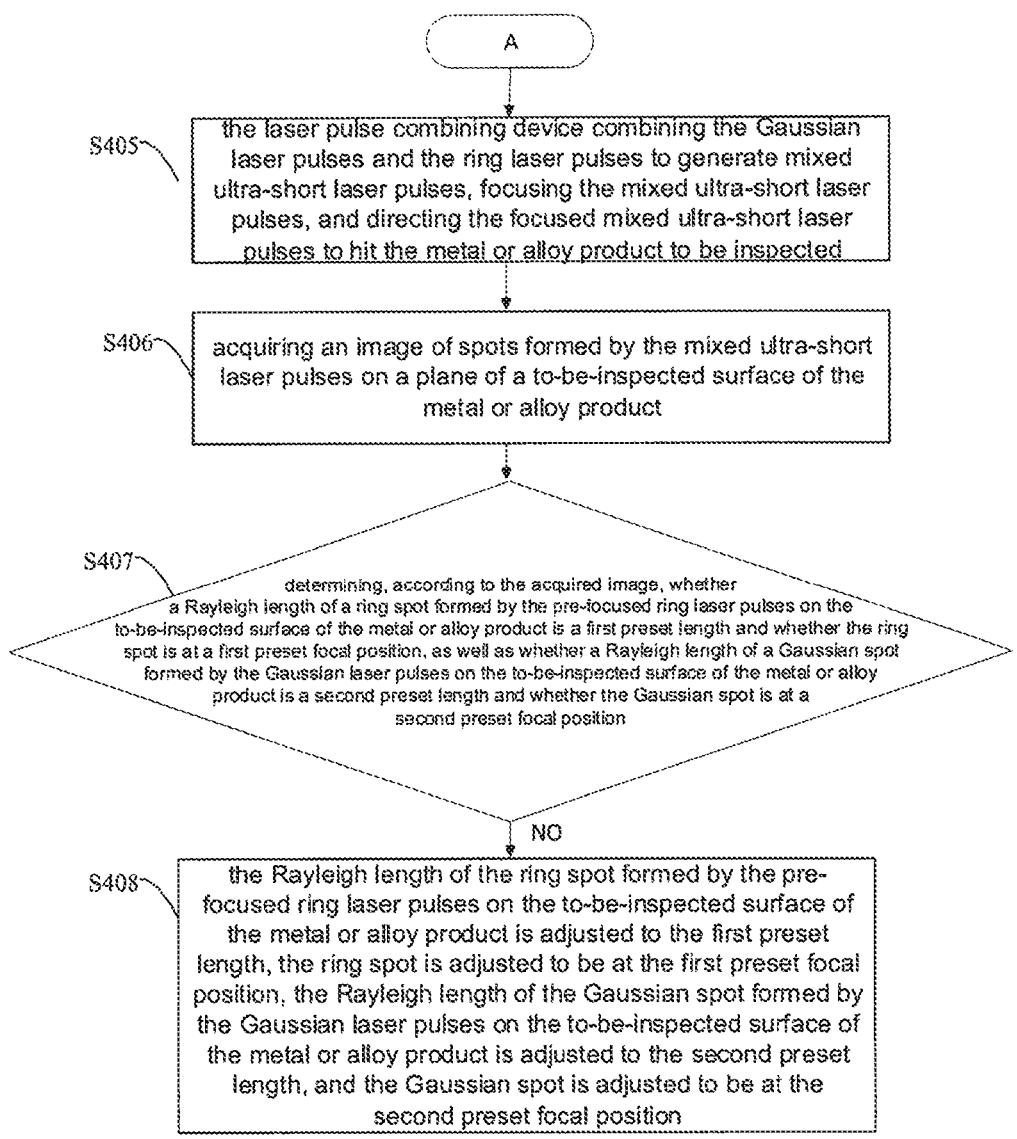
Figure 3:
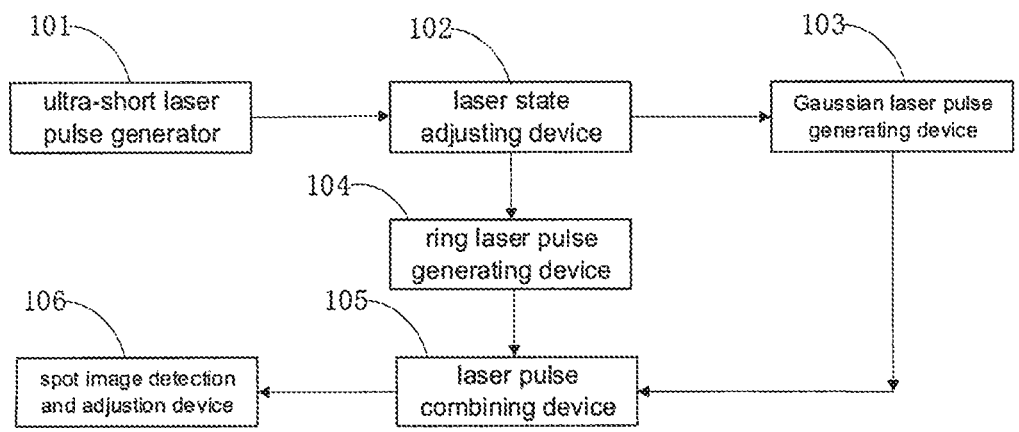
FIG. 3 is a block diagram of the structure of a system for machining micro-holes in the metal or alloy product provided in an embodiment of the present disclosure.

Referring to FIG. 1 and FIG. 2, embodiments of the present disclosure provide a method for machining micro-holes in a metal or alloy product, and a system for machining metal or alloy products. As shown in FIG. 3, the system for machining metal or alloying products includes an ultra-short laser pulse generator 101, a laser state adjusting device 102, a Gaussian laser pulse generating device 103, a ring laser pulse generating device 104 and a laser pulse combining device 105. The method for machining micro-holes in a metal or alloy product includes the following steps.

Step S401, an ultra-short laser pulse generator 101 generating an ultra-short laser pulses and outputting the ultra-short laser pulses to a laser state adjusting device 102.

Here, in the present embodiment, various parameters of a femtosecond ultra-short laser pulse include: a central wavelength of 800 nm; a laser linewidth of 40 nm; a laser pulse width of 120 fs; a repetition frequency of 1 kHz; an output power of 1 W; a power fluctuation less than 5% and a laser polarization direction with horizontal polarization state.

Step S402, the laser state adjusting device 102 regulating a diameter of a spot formed by the ultra-short laser pulses output by the ultra-short laser pulse generator 101 to a required first spot diameter, splitting the regulated ultra-short laser pulses into a first laser beam and a second laser beam, and outputting the first laser beam and the second laser beam to the Gaussian laser pulse generating device 103 and the ring laser pulse generating device 104, respectively. Here, laser pulses of each of the first laser beam and the second laser beam per unit time are in number of a preset value.

Figure 4:
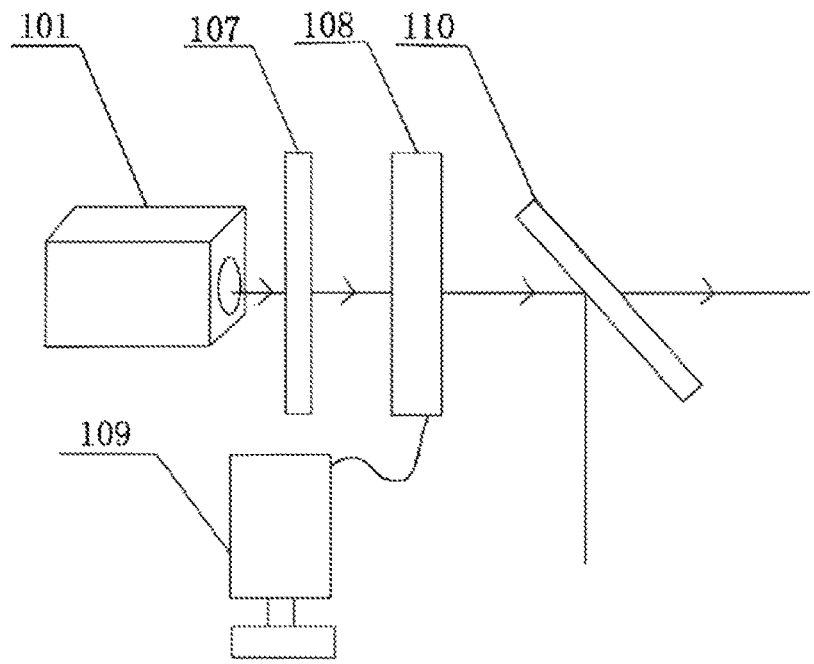
FIG. 4 is a schematic diagram of the structure of a laser state adjusting device provided in an embodiment of the present disclosure.
Figure 5:
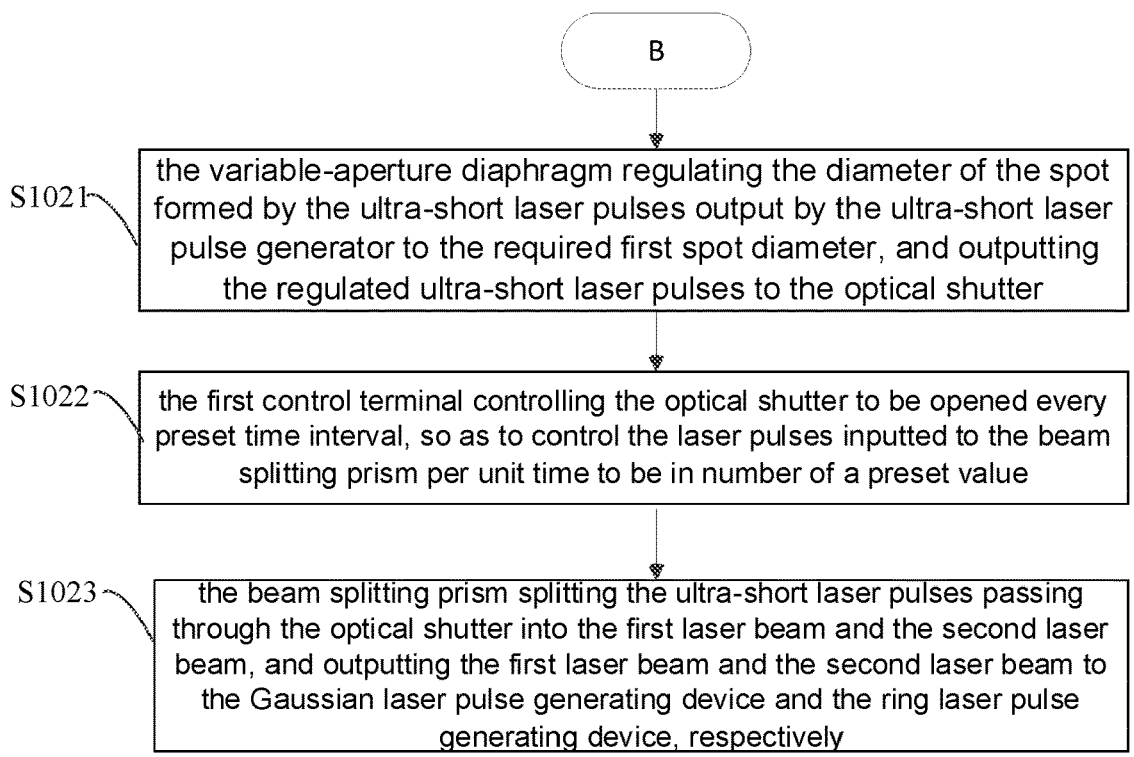
FIG. 5 is a flow chart of the sub-steps of Step S402 provided in an embodiment of the present disclosure.

Specifically, as shown in FIG. 4, the laser state adjusting device 102 in the present embodiment includes a variable-aperture diaphragm 107, an optical shutter 108, a first control terminal 109 and a beam splitting prism 110. The first control terminal 109 is electrically connected with the optical shutter 108. As shown in FIG. 5, Step S402 specifically includes:

Step S1021, the variable-aperture diaphragm 107 regulating the diameter of the spot formed by the ultra-short laser pulses output by the ultra-short laser pulse generator 101 to the required first spot diameter, and outputting the regulated ultra-short laser pulses to the optical shutter 108. In the present embodiment, an aperture of the variable-aperture diaphragm 107 is set to be 10 mm;

Step S1022, the first control terminal 109 controlling the optical shutter 108 to be opened every preset time interval, so as to control the laser pulses inputted to the beam splitting prism 110 per unit time to be in number of a preset value. In the present embodiment, continuously regulatable pulse is set to be in number of 10 or more, an opening/closing response time of the shutter is $1/10000$ s; and Step S1023, the beam splitting prism 110 splitting the ultra-short laser pulses passing through the optical shutter 108 into the first laser beam and the second laser beam, and outputting the first laser beam and the second laser beam to the Gaussian laser pulse generating device 103 and the ring laser pulse generating device 104, respectively. In the present embodiment, an operating wavelength of the beam splitting prism 110 is 800 nm, and a laser beam with a wavelength of 800 nm is split into two laser beams at 800 nm with equal energy.

As another embodiment, the laser state adjusting device 102 also may only include the variable-aperture diaphragm 107 and the beam splitting prism 110. In this case, Step S401 includes the ultra-short laser pulse generator 101 generating a femtosecond ultra-short laser pulse and outputting the femtosecond ultra-short laser pulse to the variable-aperture diaphragm 107. Here, the femtosecond ultra-short laser pulse inputted to the variable-aperture diaphragm 107 per unit time is controlled to be in number of a preset value.

Step S402 may also include: the variable-aperture diaphragm 107 regulating the diameter of the spot formed by the ultra-short laser pulses output by the ultra-short laser pulse generator 101 to the required first spot diameter, and outputting the regulated laser pulses to the beam splitting prism 110; and the beam splitting prism 110 splitting the regulated ultra-short laser pulses into the first laser beam and the second laser beam, and outputting the first laser beam and the second laser beam to the Gaussian laser pulse generating device 103 and the ring laser pulse generating device 104, respectively.

Step S403, the Gaussian laser pulse generating device 103 regulating power of the first laser beam, collimating the first laser beam, regulating the spot of the first laser beam to have a required second spot diameter, delaying the regulated first laser beam to generate Gaussian laser pulses, and outputting the Gaussian laser pulses to the laser pulse combining device 105.

Figure 6:
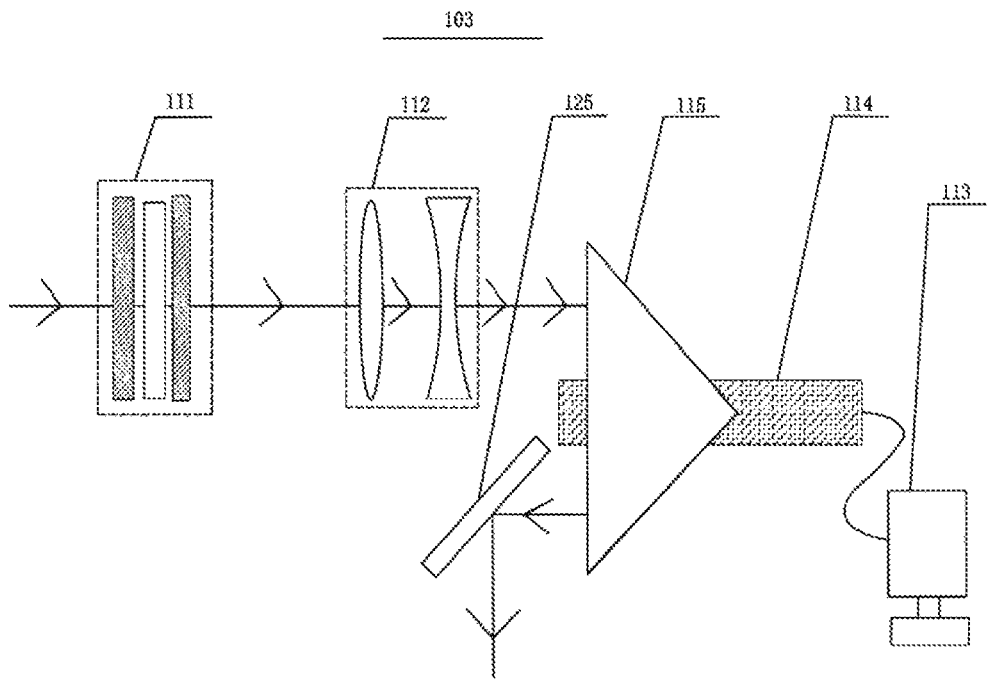
FIG. 6 is a schematic diagram of the structure of a Gaussian laser pulse generating device provided in an embodiment of the present disclosure.
Figure 7:
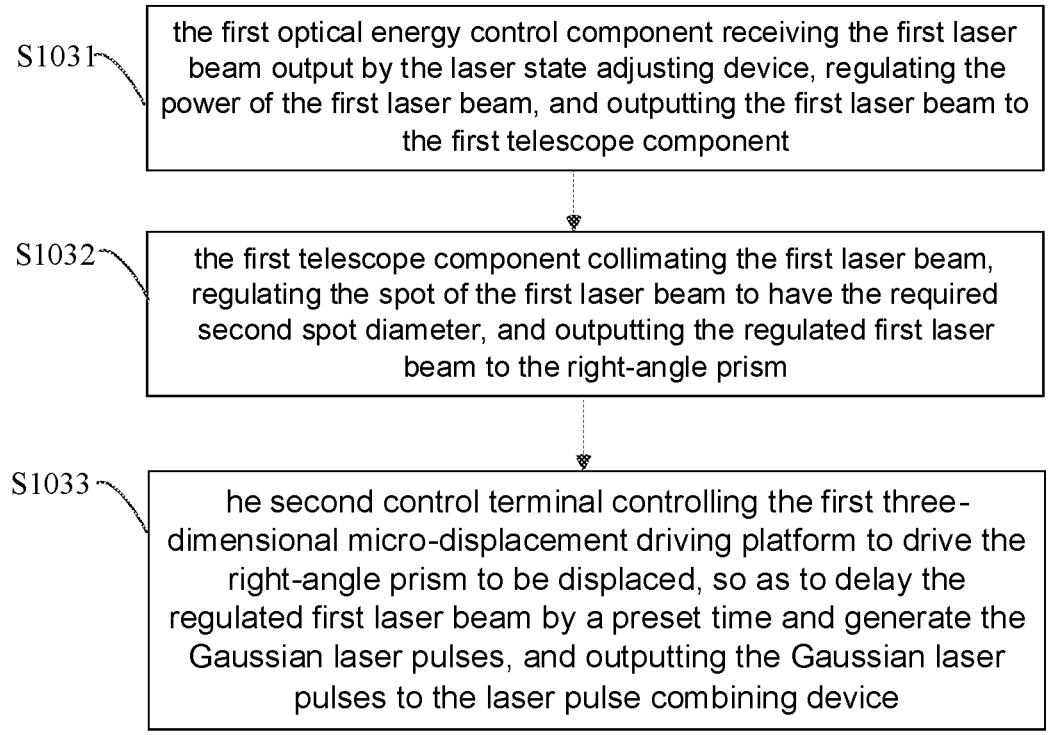
FIG. 7 is a flow chart of the sub-steps of Step S403 provided in an embodiment of the present disclosure.

Specifically, as shown in FIG. 6, the Gaussian laser pulse generating device 103 in the present embodiment includes a first optical energy control component 111, a first telescope component 112, a second control terminal 113, a first three-dimensional micro-displacement driving platform 114 and a right-angle prism 115. The second control terminal 113 is electrically connected with the first three-dimensional micro-displacement driving platform 114. The right-angle prism 115 is mounted on the first three-dimensional micro-displacement driving platform 114. As shown in FIG. 7, Step S403 includes:

Step S1031, the first optical energy control component 111 receiving the first laser beam output by the beam splitting prism 110, regulating the power of the first laser beam, and outputting the first laser beam to the first telescope component 112;

Step S1032, the first telescope component 112 collimating the first laser beam, regulating the spot of the first laser beam to have the required second spot diameter, and outputting the regulated first laser beam to the right-angle prism 115; and Step S1033, the second control terminal 113 controlling the first three-dimensional micro-displacement driving platform 114 to drive the right-angle prism 115 to be displaced, so as to delay the regulated first laser beam by a preset time and generate the Gaussian laser pulses, and outputting the Gaussian laser pulses to the laser pulse combining device 105.

Specifically, in the present embodiment, the first energy control component is a combination of a neutral density filter set and a variable optical attenuation plate. Certainly, the first energy control component may also be a combination of a half-wave plate and a polarizing film or may be a variable optical attenuator, which is not limited herein. The first telescope component 112 includes a convex lens and a concave lens. A focal length of the convex lens is 400 mm, and a focal length of the concave lens is −200 mm. The convex lens and the concave lens, whose right focus coincides with each other, compose the first telescope component 112. The first three-dimensional micro-displacement driving platform 114 has a regulation range of ±25 mm and an adjustment accuracy of 1 μm. A dielectric reflecting mirror 125 with operating wavelength of 800 nm is placed in the beam reflection path of the right-angle prism 115 to reflect the first laser beam to the laser pulse combining device 105.

Step S404, the ring laser pulse generating device 104 regulating power of the second laser beam, collimating the second laser beam, regulating a spot of the second laser beam to have a required third spot diameter, then modulating the regulated second laser beam into ring laser pulses, pre-focusing the ring laser pulses and outputting the pre-focused ring laser pulses to the laser pulse combining device 105.

Figure 8:
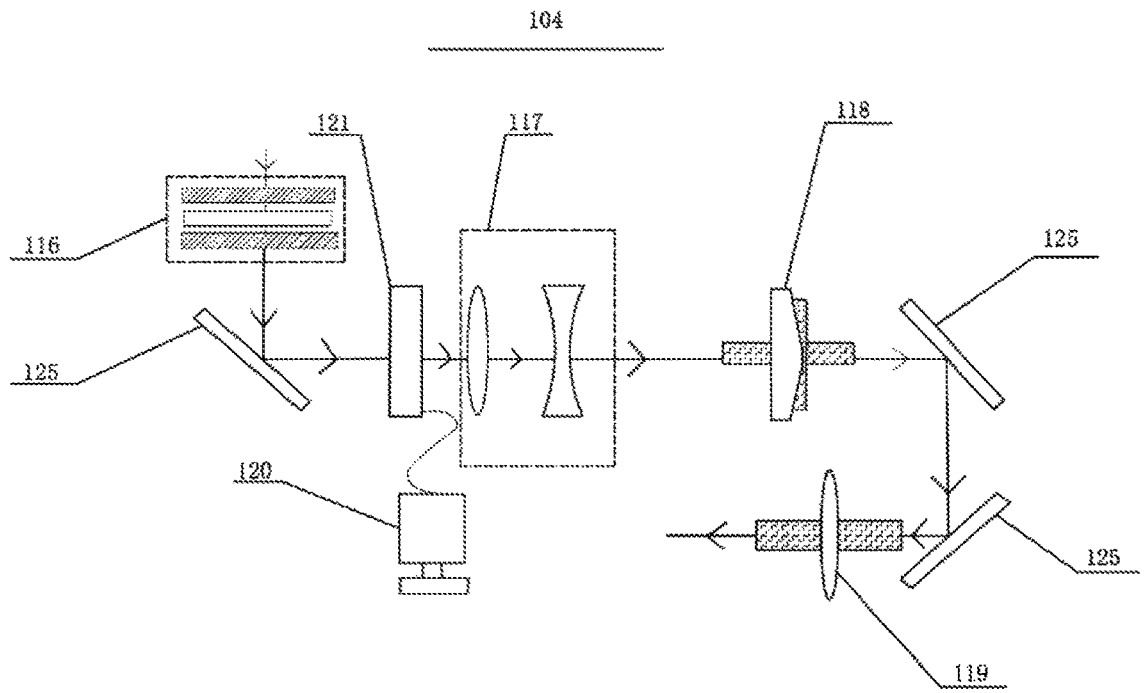
FIG. 8 is a schematic diagram of the structure of a ring laser pulse generating device provided in an embodiment of the present disclosure.
Figure 9:
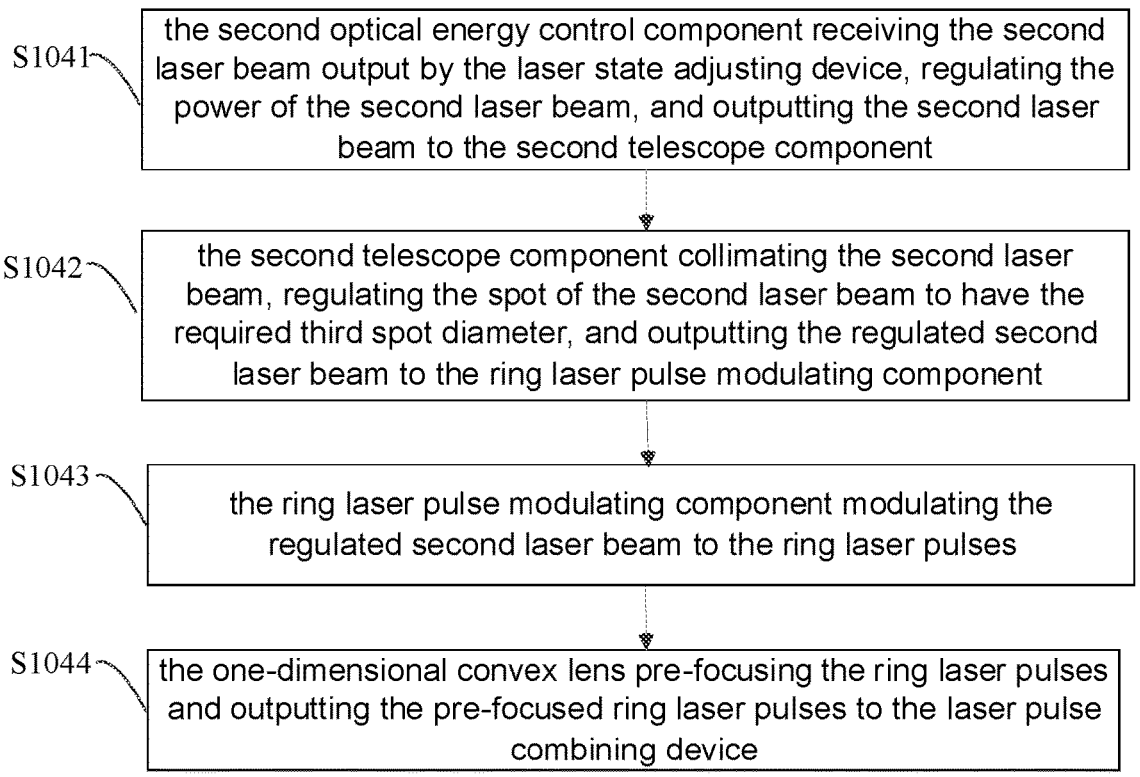
FIG. 9 is a flow chart of the sub-steps of Step S404 provided in an embodiment of the present disclosure.

Specifically, as shown in FIG. 8, the ring laser pulse generating device 104 in the present embodiment includes a second optical energy control component 116, a second telescope component 117, a ring laser pulse modulating component 118 and a one-dimensional convex lens 119. As shown in FIG. 9, Step S404 includes:

Step S1041, the second optical energy control component 116 receiving the second laser beam output by the beam splitting prism 110, regulating the power of the second laser beam, and outputting the second laser beam to the second telescope component 117;

Step S1042, the second telescope component 117 collimating the second laser beam, regulating the spot of the second laser beam to have the required third spot diameter, and outputting the regulated second laser beam to the ring laser pulse modulating component 118;

Step S1043, the ring laser pulse modulating component 118 modulating the regulated second laser beam to the ring laser pulses; and Step S1044, the one-dimensional convex lens 119 pre-focusing the ring laser pulses and outputting the pre-focused ring laser pulses to the laser pulse combining device 105.

In the present embodiment, the second optical energy control component is a combination of a neutral density filter set and a variable optical attenuation plate. Certainly, the second optical energy control component may also be a combination of half-wave plates and polarizing films or may be a variable optical attenuator, which is not limited herein. The second telescope component 117 also includes a convex lens and a concave lens. A focal length of the convex lens is 400 mm, and a focal length of the concave lens is −200 mm. The convex lens and the concave lens, whose right focus coincides with each other compose the second telescope component 117. A axicon lens is used as the ring laser pulse modulating component 118 and is mounted on a manually adjustable two-dimensional micro-displacement driving platform, and the second laser beam is inputted perpendicularly to a planar surface of the axicon lens. An optical axis of an optical arm formed by the ring laser pulse generating device 104 coincides with an optical axis of the axicon lens. Certainly, the ring laser pulse modulating component 118 may also be a second spatial optical modulator. In this case, the third control terminal 120 is configured to control the second spatial optical modulator to modulate the second laser beam to the ring laser pulse. The two-dimensional micro-displacement driving platform has a displacement accuracy of 5 μm/step along both axis x and axis y. A cone-apex angle of the axicon lens is 179 degrees. The ring laser pulse generating device 104 further includes two dielectric reflecting mirrors 125. The two dielectric reflecting mirrors 125 reflect the second laser beam from the axicon lens into the one-dimensional convex lens 119. The one-dimensional convex lens 119 has a focal length of 400 mm, and the one-dimensional convex lens 119 is mounted and fixed on a manually operated one-dimensional micro-displacement moving platform. The one-dimensional micro-displacement moving platform has a regulation range of ±25 mm and an adjustment accuracy of 1 μm along the beam propagation direction.

Preferably, the ring laser pulse generating device 104 further includes a third control terminal 120 and a first spatial optical modulator 121. The third control terminal 120 is electrically connected with the first spatial optical modulator 121. The first spatial optical modulator 121 receives the second laser beam inputted by the second optical energy control component 116. The third control terminal 120 controls the first spatial optical modulator 121 to modulate the second laser beam, such that the energy of the second laser beam is distributed evenly. The first spatial optical modulator 121 also outputs the modulated second laser beam to the second telescope component 117.

The optical path difference between the optical arm formed by the Gaussian laser pulse generating device 103 and the optical arm formed by the ring laser pulse generating device 104 is within a preset threshold range. In the present embodiment, the optical path difference is 36 μm. The laser pulses contained in the second laser beam have a time delay of 120 fs with respect to the laser pulses contained in the first laser beam. Here, the delay zero point is determined by interference fringes.

Figure 10:
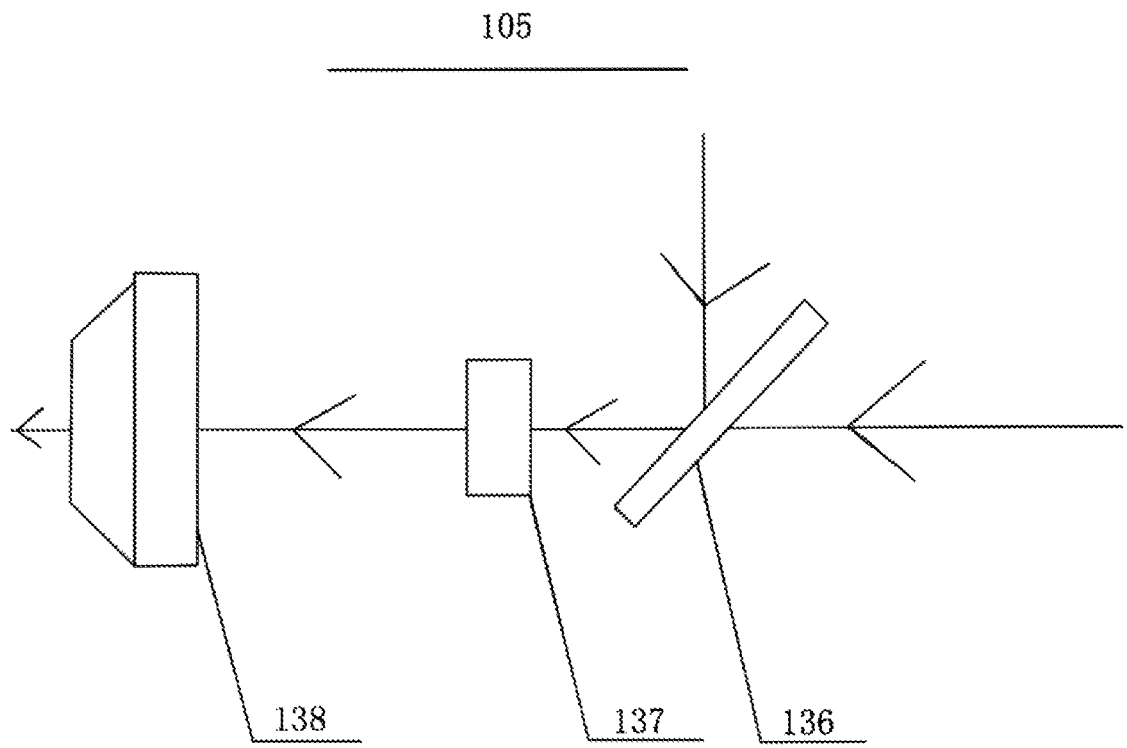
FIG. 10 is a schematic diagram of the structure of a laser pulse combining device provided in an embodiment of the present disclosure.
Figure 11:
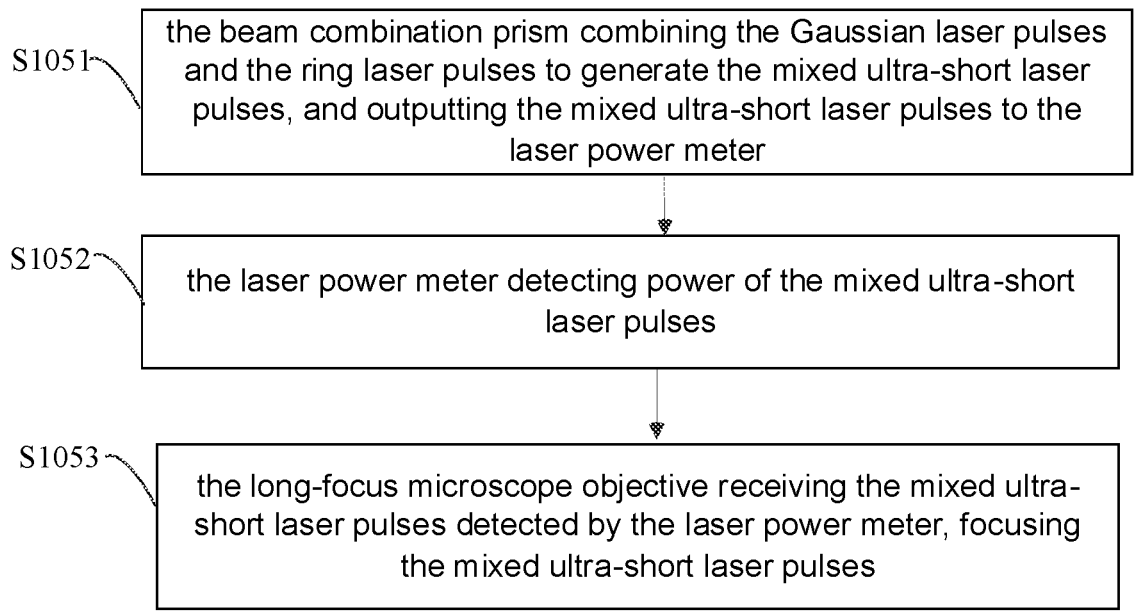
FIG. 11 is a flow chart of the sub-steps of Step S405 provided in an embodiment of the present disclosure.

Step S405, the laser pulse combining device 105 combining the Gaussian laser pulses and the ring laser pulses to generate mixed ultra-short laser pulses, focusing the mixed ultra-short laser pulses, and directing the focused mixed ultra-short laser pulses to hit the metal or alloy product to be inspected. A ratio between the diameter of a central ring of a ring spot formed by the pre-focused ring laser pulses and the diameter of a central ring of a Gaussian spot formed by the focused Gaussian laser pulses is greater than 1. Specifically, as shown in FIG. 10, the laser pulse combining device 105 in the present embodiment includes a beam combination prism 136, a laser power meter 137 and a long-focus microscope objective 138. As shown in FIG. 11, Step S405 includes:

Step S1051, the beam combination prism 136 combining the Gaussian laser pulses and the ring laser pulses to generate the mixed ultra-short laser pulses, and outputting the mixed ultra-short laser pulses to the laser power meter 137;

Step S1052, the laser power meter 137 detecting the power of the mixed ultra-short laser pulses. Here, the power meter has a measurement accuracy better (lower) than 1 nW and a measurement range greater than 1 W. The laser power of the ring laser pulse can be measured when the optical arm formed by the Gaussian laser pulse generating device 103 is shielded, and the laser power of the Gaussian laser pulse can be measured when the optical arm formed by the ring laser pulse generating device 104 is shielded; and Step S1053, the long-focus microscope objective 138 receiving the mixed ultra-short laser pulses detected by the laser power meter 137, focusing mixed ultra-short the laser pulses, and directing the focused mixed ultra-short laser pulses to hit the metal or alloy product to be inspected. The long-focus microscope objective 138 is mounted on a manually operated two-dimensional displacement driving platform. The ratio between the diameter of the central ring of the ring spot formed by the pre-focused ring laser pulses and the diameter of the central ring of the Gaussian spot formed by the focused Gaussian laser pulses is greater than 1. For example, the ratio between the diameter of the central ring of the ring spot formed by the pre-focused ring laser pulses and the diameter of the central ring of the Gaussian spot formed by the focused Gaussian laser pulses is 1.5. The locations of the manually operated two-dimensional displacement driving platform and the long-focus microscope objective 138 along axis z are adjusted, so that the focus of the Gaussian spot is 50 μm ahead of the focus of the ring spot, and that both the spot diameter of the ring laser pulse and the spot diameter of the Gaussian laser pulse are less than the geometrical aperture diameter of the long-focus microscope objective 138.

In addition, the system for machining metal or alloy products further includes a spot image detection and adjustion device 106. The method for machining the metal or alloy product further includes:

Step S406, acquiring an image of the spots formed by the mixed ultra-short laser pulses on a plane of a to-be-inspected surface of the metal or alloy product;

Step S407, determining, according to the acquired image, whether a Rayleigh length of the ring spot formed by the pre-focused ring laser pulses on the to-be-inspected surface of the metal or alloy product is a first preset length, and whether the ring spot is at a first preset focal position, as well as whether a Rayleigh length of the Gaussian spot formed by the Gaussian laser pulses on the to-be-inspected surface of the metal or alloy product is a second preset length and whether the Gaussian spot is at a second preset focal position, where if not, executing Step S108; and Step S108, adjusting the Rayleigh length of the ring spot, formed by the pre-focused ring laser pulses on the to-be-inspected surface of the metal or alloy product, to the preset first length, adjusting the ring spot to be at the first preset focal position, adjusting the Rayleigh length of the Gaussian spot, formed by the Gaussian laser pulses on the to-be-inspected surface of the metal or alloy product, to the second preset length and adjusting the Gaussian spot to be at the second preset focal position.

Figure 12:
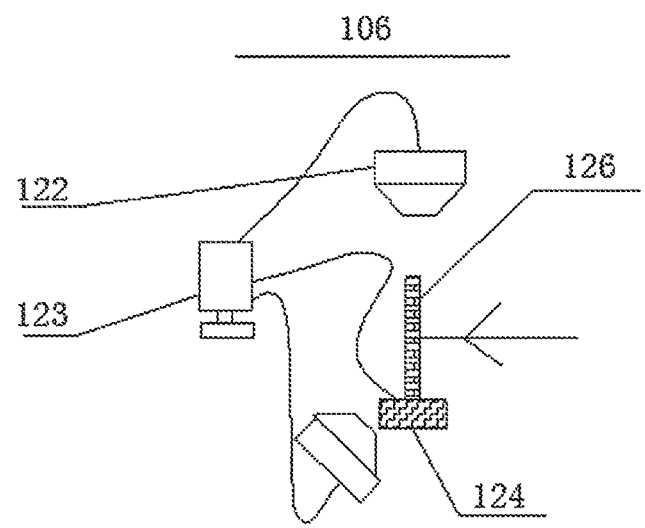
FIG. 12 is a schematic diagram of the structure of a spot image detection and adjustion device provided in an embodiment of the present disclosure.

Specifically, as shown in FIG. 12, the spot image detection and adjustion device 106 includes an image acquisition module 122, a fourth control terminal 123 and a second three-dimensional micro-displacement driving platform 124. The fourth control terminal 123 is electrically connected with each of the image acquisition module 122 and the second three-dimensional micro-displacement driving platform 124. Step S406 includes the image acquisition module 122 acquiring the image of the spots formed by the mixed ultra-short laser pulses on a plane of a to-be-inspected surface of the metal or alloy product. Step S407 includes the fourth control terminal 123 determining, according to the acquired image, whether the Rayleigh length of the ring spot formed by the pre-focused ring laser pulses on the to-be-inspected surface of the metal or alloy product is the first preset length, whether the ring spot is at first the preset focal position, whether the Rayleigh length of the Gaussian spot formed by the Gaussian laser pulses on the to-be-inspected surface of the metal or alloy product is the second preset length and whether the Gaussian spot is at the second preset focal position, if not, executing Step S108.

Step S108 includes the fourth control terminal 123 controlling the second three-dimensional micro-displacement driving platform 124 to move, such that the Rayleigh length of the ring spot formed by the pre-focused ring laser pulses on the to-be-inspected surface of the metal or alloy product is the first preset length, the ring spot is at the first preset focal position, the Rayleigh length of the Gaussian spot formed by the Gaussian laser pulses on the to-be-inspected surface of the metal or alloy product is the second preset length, and the Gaussian spot is at the second preset focal position.

In the present embodiment, the metal or alloy product to be inspected is mounted on the second three-dimensional micro-displacement driving platform 124. With the fourth control terminal 123, it is possible to control the second three-dimensional micro-displacement platform, such that the metal or alloy product to be inspected is positioned at front of the Rayleigh length of the ring spot, that the Gaussian spot formed by the first laser beam on the surface to be inspected of the metal or alloy product is at the preset second focal position, and the ring spot formed by the second laser beam on the surface to be inspected of the metal or alloy product is at the preset first focal position. In addition, the image acquiring device has a spatial resolution better (less) than 2 μm. The metal or alloy product to be inspected is 304# stainless steel plate 126, and may have a thickness of 0.300 mm or 0.400 mm or 0.500 mm and a surface roughness Ra<100 nm.

Before implementing the method for machining micro-holes in the metal or alloy product, the corresponding system for machining micro-holes in the metal or alloy product may be operated by the following process: a first laser pulse (i.e., a Gaussian laser pulse 135) and a second laser pulse (i.e., a ring laser pulse 132) are adjusted so that the first and second laser pulse are transmitted in a collinear manner, namely, the first and second laser pulse are placed at a central axis 127 of the micro-hole, and it is ensured that the spot centers of the Gaussian laser pulse 135 and the ring laser pulse 132 coincide with each other and coincide with the central axis of the laser; and then the central axis 127 of the micro-hole to be bored and the central axis of the laser are adjusted to coincide with each other, and the surface of an area of the stainless steel plate 126 where the hole is to be bored is ensured to be perpendicular to the central axis of the laser.

Then, the laser parameters of both the Gaussian laser pulse 135 and the ring laser pulse 132 are set, such that the Gaussian laser pulse 135 and the ring laser pulse 132 meet the machining requirements. Here, the laser parameters of the Gaussian laser pulse 135 include single-pulse laser energy, pulse width, pulse repetition frequency, laser center wavelength, focal spot size, and defocusing amount of the laser. In the present embodiment, the Gaussian laser pulse 135 has a single-pulse laser energy less than 10 mJ, for example, preferably 0.01 to 1 mJ, has a pulse width (FWHM) less than 10 ps, for example, preferably but not limited to 10 to 200 fs, has a repetition frequency less than 10 kHz, for example, preferably but not limited to 1 kHz, 2 kHz, has a laser center wavelength less than 1.5 μm, for example, preferably but not limited to 1.064 μm, 0.8 μm and 0.79 μm, has a focused focal spot diameter less than 25 μm, for example, preferably but not limited to 2 to 10 μm, and has a defocusing amount of the focused focal spot with respect to the surface of the stainless steel plate 126 is less than ±100 μm, for example, preferably but not limited to −50 μm to 0 μm.

The parameters of the ring laser pulse 132 include single-pulse laser energy, pulse width, pulse repetition frequency, laser center wavelength, focal spot size, defocusing amount of the laser, and delay time of the ring laser pulse 132 relative to the Gaussian laser pulse 135. In the present embodiment, the ring laser pulse 132 has a single-pulse laser energy less than 10 mJ, typically 0.01 to 1 mJ, has a pulse width (FWHM) less than 10 ps, for example, preferably but not limited to 10 to 200 fs, has a repetition frequency less than 10 kHz, for example, preferably but not limited to 1 kHz, 2 kHz, has a laser center wavelength less than 1.5 μm, for example, preferably but not limited to 1.064 μm, 0.8 μm, 0.79 μm, 0.532 μm, 0.4 μm and 0.395 μm, and has a focused focal spot ring with an inner diameter slightly less than or equal to 25 μm, for example, preferably but not limited to 2 to 10 μm, has a focused focal spot ring with an outer diameter less than 50 μm, for example, preferably but not limited to 5 to 25 μm; and has a defocusing amount of the focused focal spot with respect to the surface of the stainless steel plate 126 less than ±100 μm, for example, preferably but not limited to −25 μm to 0 μm. The delay time of the ring laser pulse 132 relative to the Gaussian laser pulse 135 is shorter than the lifetime of the plasma generated by the Gaussian laser pulse 135, and is preferably but not limited to 1 to 100 times of the laser pulse width.

Figure 13:
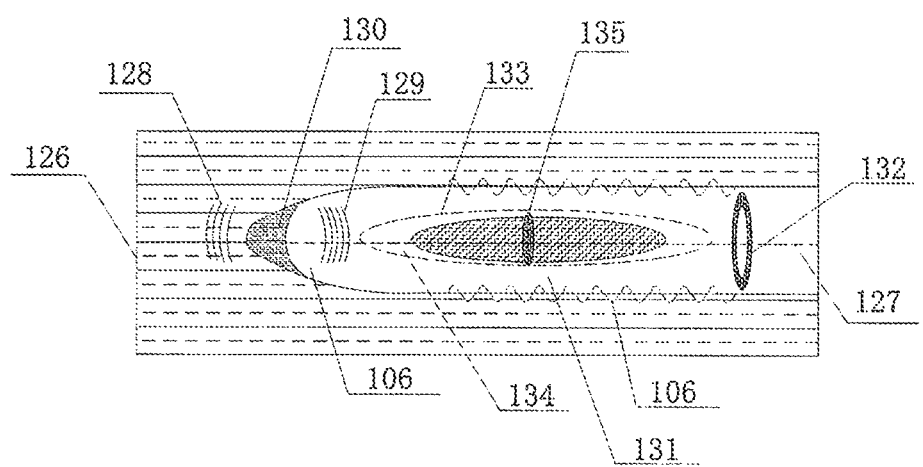
FIG. 13 is a schematic diagram of the working principle of the method for machining micro-holes in a metal or alloy product provided in an embodiment of the present disclosure.

As shown in FIG. 13, the working principle of adopting the method for machining micro-holes in the metal or alloy product to machine the stainless steel plate 126 is as follows. The Gaussian laser pulses 135 contained in the generated mixed ultra-short laser pulses are irradiated onto a front surface of the stainless steel plate 126 or into a micro-hole previously formed (in the present embodiment, it is illustrated by taking a previously formed micro-hole as an example), such that primary plasma is generated in the micro-hole of the stainless steel plate 126. The primary plasma includes dense plasma, critical plasma density surface and under-dense plasma. The micro-hole already formed in the front surface refers to a micro-hole that has been formed by a pulse previously irradiated during a hole formation with multi-pulse irradiation. The central area of the ring laser pulses 132 contained in the mixed ultra-short laser pulses may be spared from the "plasma mirror" effect of the dense plasma area 134, which reduces the energy loss of reflection and scattering of the delayed ring laser pulse 132. The first stage of energy injection from the ring laser pulses 132 can be carried out in the under-dense plasma area 131. Meanwhile, based on the propagation characteristics of plasma waves on the critical density surface 133, the second stage of energy injection from the ring laser pulse 132 can be carried out by utilizing an interface between the under-dense plasma and the workpiece material, and thereby the efficiency of energy injection from the ring laser pulse 132 is improved. At the same time, secondary plasma is generated and thus backward shock waves 129. The backward shock waves 129 generated by the secondary plasma accelerate the ejection of the primary plasma in a direction opposite to the direction in which the mixed ultra-short laser pulses are output. Moreover, an ejection passage for the primary plasma is created by utilizing the central area of the ring laser pulses 132, and thus the ejection efficiency of materials is improved. The secondary plasma and the forward shock waves 128 generated therefrom may be used to further deepen the micro-hole, hence the utilization rate of laser energy is improved. The above processes are repeated for the subsequent mixed ultra-short laser pulses, until the hole depth meets the required depth limit or depth requirements. In this way, a micro-hole depth limit is achievable by only changing the number of ultra-short laser pulses.

To sum up, the method for machining micro-holes in the metal or alloy products provided in embodiments of the present disclosure realizes the beneficial effects as follows. In the case where the mixed ultra-short laser pulses are perpendicularly output to the surface to be inspected according to a delay time, it is possible to inject more energy to the bottom of a micro-hole formed on a to-be-inspected surface of a metal or alloy product, and secondary plasma 130 may be generated at the bottom of the micro-hole, which contributes to deepening of the micro-hole, thus facilitating the hole depth to reach the required limit depth requirement. The first laser beam first reaches the surface to be inspected to inject energy and generate the primary plasma. During a period after the primary plasma is generated and before the primary plasma vanishes, the delayed second laser beam reaches the surface to be inspected. At this point, the ring laser pulses 132 penetrate and cross over the primary plasma, so as to achieve secondary energy injection and generate secondary plasma 130 at the bottom of the micro-hole, to inject energy by the delayed ring laser pulses 132, while the central hollow area further facilitates the creation of an ejection passage for the primary plasma. Backward shock waves 129 generated by the localized secondary plasma 130 accelerate the rapid ejection of the primary plasma, shortening the time of ejection of the primary plasma, reducing the residuals produced during the ejection of the primary plasma, and improving the smoothness of the hole wall of the micro-hole. Forward shock waves 128 generated by the localized secondary plasma 130 can further deepen the micro-hole. Injecting energy by low-energy pulse laser in two attempts further facilitates the reduction of the diameter of the micro-hole and reduces the possibility of cracks, compared with single high-energy pulse laser of the same total energy. Moreover, the ratio between the diameter of the central ring of the ring spot formed by the pre-focused ring laser pulses and the diameter of the central ring of the Gaussian spot formed by the focused Gaussian laser pulses is greater than 1, which can improve the injection efficiency of laser energy.

The above description only shows the preferable embodiments of the present disclosure and does not limit the present disclosure. Various modifications and variations of the present disclosure will occur to those skilled in the art. Any modifications, equivalent replacements and improvements made within the spirit and principle of the present disclosure shall be encompassed by the scope of protection of the present disclosure.

The invention claimed is:

1. A method for machining micro-holes in a metal or alloy product, comprising steps of:

step A. an ultra-short laser pulse generator generating ultra-short laser pulses and outputting the ultra-short laser pulses to a laser state adjusting device;

step B. the laser state adjusting device regulating a diameter of a spot formed by the ultra-short laser pulses output by the ultra-short laser pulse generator to a required first spot diameter, splitting the regulated ultra-short laser pulses into a first laser beam and a second laser beam, and outputting the first laser beam and the second laser beam to a Gaussian laser pulse generating device and a ring laser pulse generating device respectively, wherein laser pulses of each of the first laser beam and the second laser beam per unit time are in number of a preset value;

step C. the Gaussian laser pulse generating device regulating power of the first laser beam, collimating the first laser beam, regulating a spot of the first laser beam to have a required second spot diameter, delaying the regulated first laser beam to generate Gaussian laser pulses, and outputting the Gaussian laser pulses to the laser pulse combining device, wherein an optical path difference between an optical arm formed by the Gaussian laser pulse generating device and an optical arm formed by the ring laser pulse generating device is within a preset range;

step D. the ring laser pulse generating device regulating power of the second laser beam, collimating the second laser beam, regulating a spot of the second laser beam to have a required third spot diameter, then modulating the regulated second laser beam into ring laser pulses, pre-focusing the ring laser pulses and outputting the pre-focused ring laser pulses to the laser pulse combining device; and step E. the laser pulse combining device combining the Gaussian laser pulses and the ring laser pulses to generate mixed ultra-short laser pulses, focusing the mixed ultra-short laser pulses, and directing the focused mixed ultra-short laser pulses to hit the metal or alloy product to be inspected, wherein, a ratio between a diameter of a central ring of a ring spot formed by the pre-focused ring laser pulses and a diameter of a central ring of a Gaussian spot formed by the focused Gaussian laser pulses is greater than 1.

2. The method for machining micro-holes in a metal or alloy product according to claim 1, wherein the laser state adjusting device comprises a variable-aperture diaphragm, an optical shutter, a first control terminal and a beam splitting prism, the first control terminal is electrically connected with the optical shutter, and the step B comprises:

the variable-aperture diaphragm regulating the diameter of the spot formed by the ultra-short laser pulses output by the ultra-short laser pulse generator to the required first spot diameter, and outputting the regulated ultra-short laser pulses to the optical shutter;

the first control terminal controlling the optical shutter to be opened every preset time interval, so as to control the laser pulses inputted to the beam splitting prism per unit time to be in number of a preset value; and the beam splitting prism splitting the ultra-short laser pulses passing through the optical shutter into the first laser beam and the second laser beam, and outputting the first laser beam and the second laser beam to the Gaussian laser pulse generating device and the ring laser pulse generating device, respectively.

3. The method for machining micro-holes in a metal or alloy product according to claim 1, wherein the laser state adjusting device comprises a variable-aperture diaphragm and a beam splitting prism, the step of outputting the ultra-short laser pulses to a laser state adjusting device comprises: outputting the ultra-short laser pulses to the variable-aperture diaphragm, wherein the ultra-short laser pulses inputted to the variable-aperture diaphragm per unit time is controlled to be in number of a preset value;

the step B comprises:

the variable-aperture diaphragm regulating the diameter of the spot formed by the ultra-short laser pulses output by the ultra-short laser pulse generator to the required first spot diameter, and outputting the regulated laser pulses to the beam splitting prism; and the beam splitting prism splitting the regulated ultra-short laser pulses into the first laser beam and the second laser beam, and outputting the first laser beam and the second laser beam to the Gaussian laser pulse generating device and the ring laser pulse generating device, respectively.

4. The method for machining micro-holes in a metal or alloy product according to claim 1, wherein the Gaussian laser pulse generating device comprises a first optical energy control component, a first telescope component, a second control terminal, a first three-dimensional micro-displacement driving platform and a right-angle prism, the second control terminal is electrically connected with the first three-dimensional micro-displacement driving platform, the right-angle prism is mounted on the first three-dimensional micro-displacement driving platform, and the step C comprises:

the first optical energy control component receiving the first laser beam output by the laser state adjusting device, regulating the power of the first laser beam, and outputting the first laser beam to the first telescope component;

the first telescope component collimating the first laser beam, regulating the spot of the first laser beam to have the required second spot diameter, and outputting the regulated first laser beam to the right-angle prism; and the second control terminal controlling the first three-dimensional micro-displacement driving platform to drive the right-angle prism to be displaced, so as to delay the regulated first laser beam by a preset time and generate the Gaussian laser pulses, and outputting the Gaussian laser pulses to the laser pulse combining device.

5. The method for machining micro-holes in a metal or alloy product according to claim 1, wherein the ring laser pulse generating device comprises a second optical energy control component, a second telescope component, a ring laser pulse modulating component and a one-dimensional convex lens, and the step D comprises:

the second optical energy control component receiving the second laser beam output by the laser state adjusting device, regulating the power of the second laser beam, and outputting the second laser beam to the second telescope component;

the second telescope component collimating the second laser beam, regulating the spot of the second laser beam to have the required third spot diameter, and outputting the regulated second laser beam to the ring laser pulse modulating component;

the ring laser pulse modulating component modulating the regulated second laser beam to the ring laser pulses; and the one-dimensional convex lens pre-focusing the ring laser pulses and outputting the pre-focused ring laser pulses to the laser pulse combining device.

6. The method for machining micro-holes in a metal or alloy product according to claim 5, wherein the ring laser pulse generating device further comprises a third control terminal and a first spatial optical modulator, the third control terminal is electrically connected with the first spatial optical modulator, and before the second optical energy control component outputs the second laser beam to the second telescope component, the method for machining micro-holes in a metal or alloy product further comprises steps of:

the first spatial optical modulator receiving the second laser beam output by the second optical energy control component;

the third control terminal controlling the first spatial optical modulator to modulate the second laser beam, such that energy of the second laser beam is distributed evenly; and the first spatial optical modulator outputting the modulated second laser beam to the second telescope component.

7. The method for machining micro-holes in a metal or alloy product according to claim 6, wherein the ring laser pulse modulating component is an axicon lens, the second laser beam is output perpendicularly to a planar surface of the axicon lens, and an optical axis of the optical arm formed by the ring laser pulse generating device coincides with an optical axis of the axicon lens; or the ring laser pulse modulating component is a second spatial optical modulator, and the third control terminal is configured to control the second spatial optical modulator to modulate the second laser beam into the ring laser pulses.

8. The method for machining micro-holes in a metal or alloy product according to claim 1, wherein the laser pulse combining device comprises a light combination prism, a laser power meter and a long-focus microscope objective, and the step E comprises:

the beam combination prism combining the Gaussian laser pulses and the ring laser pulses to generate the mixed ultra-short laser pulses, and outputting the mixed ultra-short laser pulses to the laser power meter;

the laser power meter detecting power of the mixed ultra-short laser pulses; and the long-focus microscope objective receiving the mixed ultra-short laser pulses detected by the laser power meter, focusing the mixed ultra-short laser pulses and directing the focused mixed ultra-short laser pulses to hit the metal or alloy product to be inspected.

9. The method for machining micro-holes in a metal or alloy product according to claim 1, wherein after the step E, the method for machining micro-holes in a metal or alloy product further comprises:

step F. a spot image detection and adjusting device acquiring an image of spots formed by the mixed ultra-short laser pulses on a plane of a to-be-inspected surface of the metal or alloy product, and determining, according to the acquired image, whether a Rayleigh length of a ring spot formed by the pre-focused ring laser pulses on the to-be-inspected surface of the metal or alloy product is a first preset length and whether the ring spot is at a first preset focal position, as well as whether a Rayleigh length of a Gaussian spot formed by the Gaussian laser pulses on the to-be-inspected surface of the metal or alloy product is a second preset length and whether the Gaussian spot is at a second preset focal position, wherein if not, the Rayleigh length of the ring spot formed by the pre-focused ring laser pulses on the to-be-inspected surface of the metal or alloy product is adjusted to the first preset length, the ring spot is adjusted to be at the first preset focal position, the Rayleigh length of the Gaussian spot formed by the Gaussian laser pulses on the to-be-inspected surface of the metal or alloy product is adjusted to the second preset length, and the Gaussian spot is adjusted to be at the second preset focal position.

10. The method for machining micro-holes in a metal or alloy product according to claim 9, wherein the spot image detection and adjusting device comprises an image acquisition module, a fourth control terminal and a second three-dimensional micro-displacement driving platform, the fourth control terminal is electrically connected with each of the image acquisition module and the second three-dimensional micro-displacement driving platform, and the step F comprises:

the image acquisition module acquiring the image of spots formed by the mixed ultra-short laser pulses on a plane of a to-be-inspected surface of the metal or alloy product; and the fourth control terminal determining, according to the acquired image, whether the Rayleigh length of the ring spot formed by the pre-focused ring laser pulses on the to-be-inspected surface of the metal or alloy product is the first preset length, whether the ring spot is at the first preset focal position, whether the Rayleigh length of the Gaussian spot formed by the Gaussian laser pulses on the to-be-inspected surface of the metal or alloy product is the second preset length and whether the Gaussian spot is at the second preset focal position, wherein if not, the second three-dimensional micro-displacement driving platform is controlled to move, so that the Rayleigh length of the ring spot formed by the pre-focused ring laser pulses on the to-be-inspected surface of the metal or alloy product is the first preset length, the ring spot is at the first preset focal position, the Rayleigh length of the Gaussian spot formed by the Gaussian laser pulses on the to-be-inspected surface of the metal or alloy product is the second preset length and the Gaussian spot is at the second preset focal position.

\* \* \* \* \*